United States Patent [19]

Whitehouse

[11] Patent Number: 4,777,639

[45] Date of Patent: Oct. 11, 1988

[54] LASER OPTICAL ELEMENT MOUNTING ARRANGEMENT AND METHOD

[75] Inventor: David R. Whitehouse, Weston, Mass.

[73] Assignee: PRC Corporation, Landing, N.J.

[21] Appl. No.: 941,802

[22] Filed: Dec. 15, 1986

[51] Int. Cl.⁴ ............................................. H01S 3/08
[52] U.S. Cl. .................................. 372/107; 372/99;
372/108; 372/103; 372/109
[58] Field of Search ............... 372/109, 108, 107, 98,
372/99, 101, 103, 61

[56] References Cited

U.S. PATENT DOCUMENTS

| | | |
|---|---|---|
| 3,090,116 | 5/1963 | Burgess . |
| 3,777,281 | 12/1973 | Hochuli . |
| 3,921,885 | 11/1975 | Knox . |
| 4,018,374 | 4/1977 | Lee et al. . |
| 4,153,317 | 5/1979 | Ljung et al. . |
| 4,504,956 | 3/1985 | Ream .................................. 372/107 |
| 4,653,063 | 3/1987 | Acharekar et al. ................. 372/108 |
| 4,677,639 | 6/1987 | Sasser ................................. 372/107 |
| 4,677,640 | 6/1987 | Petersen et al. .................... 372/108 |
| 4,679,204 | 7/1987 | Koseki ................................ 372/108 |
| 4,685,110 | 8/1987 | DeBell et al. ...................... 372/101 |
| 4,706,256 | 11/1987 | Sheno et al. ........................ 372/103 |

Primary Examiner—Léon Scott, Jr.
Attorney, Agent, or Firm—Antonelli, Terry & Wands

[57] ABSTRACT

A laser optical element mounting arrangement and method are disclosed wherein a laser optical element is mounted to a laser mounting support member. The mounting support member has a smooth surface to which a surface of the optical element is engaged to form a vacuum seal between the optical element and the support member. The seal is accomplished with the application of only light pressure contact between the respective surfaces at ambient temperature and without the need for a sealant.

51 Claims, 3 Drawing Sheets

LASER OPTICAL ELEMENT MOUNTING ARRANGEMENT AND METHOD

BACKGROUND AND SUMMARY OF THE INVENTION

The present invention is directed to an improved laser optical element mounting arrangement and method. More particularly, the invention concerns an improved laser optical element mounting arrangement and method for mounting a laser optical element such as a reflecting mirror, a transmitting mirror, or an output window on its mounting element member of a laser.

The known laser optical element mounting arrangements typically involve the use of an O-ring or other sealant between the optical element and the adjacent support member and between cooperating support members in the vicinity of the optical element for sealing purposes, e.g., to prevent ingress of the atmosphere into the low pressure discharge cavity of a gas laser used in the earth's atmosphere or to prevent egress of the low pressure laser gases into the higher vacuum of outer space where the laser is used in outer space. Mechanical loading of the several parts of the optical element mounting arrangement is required to effectively seal the adjacent parts through the use of the O-ring or other sealant. The forces for this mechanical loading may not be uniformly distributed which can contribute to mechanical distortion of the optical element and resultant distortion of the laser beam. If the optical element is not uniformly and symmetrically cooled, thermal distortion can also occur. These known arrangements are also disadvantageous because the sealant materials can be degraded by scattered radiation from the laser output causing particles of the sealant material to contaminate the laser optical elements thereby reducing the performance of the laser. Further, when the optical elements are removed for cleaning and then remounted on the laser, retuning of the laser is normally required. Cleaning of the optical element can also degrade the sealing material. Degraded sealing material can migrate and get on the optical surfaces of the laser thereby deteriorating its performance. O-rings can also break down at the extremely high or low temperatures such as those encountered in outer space.

An object of the present invention is to provide an improved laser optical element mounting arrangement and method which avoid the aforementioned disadvantages of the known type of mounting arrangement and method. More specifically, an object of the invention is to provide a laser optical element mounting arrangement which permits the optical element to be removed for cleaning and then remounted on the laser with minimal or no laser retuning. An additional object of the invention is to provide a laser optical element mounting arrangement which enables uniform and symmetrical cooling of the optical element to prevent thermal distortion thereof. A further object of the invention is to provide a laser optical element mounting arrangement and method which do not mechanically distort the optical element. A still further object of the invention is to provide a laser optical element mounting arrangement and method which permit the elimination of a sealant material in the immediate vicinity of the optical element. Another object of the invention is to provide a laser optical element mounting arrangement having a vacuum seal which is not dependent on temperature stability to maintain the seal.

These and other objects of the invention are attained by a laser optical element mounting arrangement of the invention which comprises a laser optical element and a laser mounting support member. The mounting support member is provided with a mounting surface which is sufficiently smooth to form a vacuum seal with a surface of the optical element with which it is engaged. The vacuum seal can be broken and remade.

The method of mounting an optical element such as a reflecting mirror, a transmitting mirror, or an output window of a laser to a mounting support member thereof comprises the steps of providing an optical element mounting surface of a support member with a surface which is sufficiently smooth to form a vacuum seal with a surface of the optical element and engaging the surfaces to form a vacuum seal between the surfaces which can be broken and remade. The two surfaces which contact one another to form the vacuum seal may both be flat or both may be curved in a like manner for mating engagement. One surface could also be flat and the other curvilinear so that essentially line contact is formed to achieve the vacuum seal between the support member and optical element. According to the disclosed, preferred embodiment of the invention, only light, hand pressure contact of the engaging surfaces at ambient temperature is necessary to form a vacuum seal between the surfaces. No o-ring or other sealant is required.

The engaging surface of the optical element itself can be flat or curved, either concave or convex. It has a smoothness sufficient to form a vacuum seal with the surface of the support member. Where the surface is flat, it preferably has a flatness of about four or fewer fringes at 0.63 micron wavelength, and in the disclosed embodiment has a flatness of less than or equal to one fringe at 0.63 micron wavelength. Where the surface of the support member is flat it also preferably has a flatness of about four or fewer fringes at 0.63 micron wavelength.

The optical element is located within an opening of an additional support member which is releasably connected to the mounting support member. A resilient member is mounted between the additional support member and the optical element on the side of the optical element opposite the side of the optical element which is vacuum sealed to the mounting support member. In the disclosed embodiment, at least the surface of the optical element engaged with the mounting support member is coated with a layer material. The coating material can be metal, such copper, gold, a gold-silver alloy or silver. Such an outer metal coating can be located over a coating of nickel, for example, provided on at least the surface of the optical element which is adhered to the mounting support member. The coating material can also be a non-metallic material such as a non-metallic dielectric material. Alternatively, no coating need be applied on the optical element or at least not on the surface of the element which is vacuum sealed to the mounting support member.

These and other objects, features and advantages of the present invention will become more apparent from the following description when taken in connection with the accompanying drawings which show, for purposes of illustration only, three embodiments in accordance with the invention.

DETAILED DESCRIPTION OF THE DISCLOSED EMBODIMENTS

Figure 1:
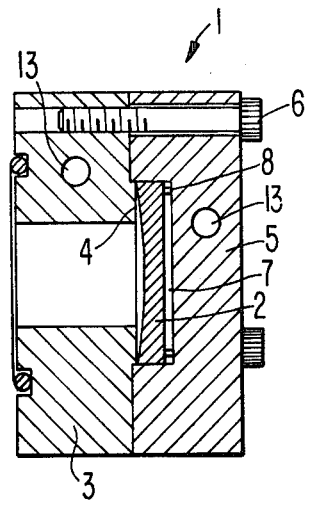
FIG. 1 is a cross-sectional view taken along the line I—I in FIG. 2 through the central optic axis of a reflecting mirror of a laser rear mirror mounting arrangement according to the invention as shown in FIG. 2.
Figure 2:
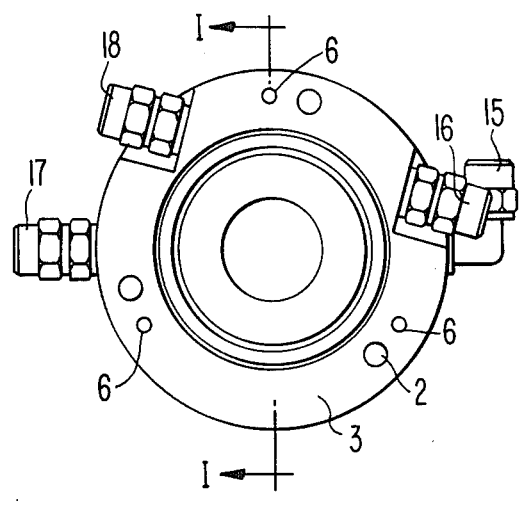
FIG. 2 is an end view of a laser rear mirror mounting arrangement according to a preferred embodiment of the invention.

Referring now to the drawings, the laser optical element mounting arrangement 1 shown in FIGS. 1 and 2 is seen to comprise an optical element 2 in the form of a reflecting mirror and a laser mounting support member 3. The support member 3 may be formed of an aluminum alloy such as 2024 or 6061. The support member 3 has an optically flat, annular mounting surface 4 upon which the laser optical element 2 is mounted. The surface 4 has a smoothness sufficient to form a vacuum seal with a surface of the optical element 2 when the two surfaces are contacted with one another.

The flat mounting surface 4 in the disclosed embodiment has a flatness of about four or fewer fringes at 0.63 micron wavelength for this purpose. The surface 4 is lap polished to attain this degree of flatness. More specifically, the mounting surface 4 can be lapped using 240-320 grit lapping compound and a lapping plate. The surface 4 is lapped using a circular motion until the entire surface shows signs of contact. The mounting surface 4 is then cleaned thoroughly and a small amount of 6 micron diamond polishing compound is placed on a clean glass plate. The support member 3 is placed so that the mounting surface 4 thereon is face down on the glass plate. The member 3 and surface 4 are then carefully lapped using small circular motions. The surface 4 is lapped until the entire surface shows signs of even contact, then washed thoroughly and checked using an optical flat if need be. The surface should be lapped according to this procedure until it has a surface flatness of 3 to 4 fringes at 0.63 micron wavelength.

The reflecting mirror 2 is formed of a copper substrate which is coated with a layer of nickel. The nickel layer, in turn, is coated with a layer of gold, a gold-silver alloy or silver to provide a totally reflective optical element. Alternatively, the mirror could be formed of other materials such as a silicon substrate coated with other metallic or dielectric layers. The radius of curvature of the mirror in FIG. 1 is exaggerated. The actual radius of curvature is large, 15 meters, for example. The mirror 2 could also be flat with a flatness or surface figure of the mirror being preferably less than or equal to 1 fringe at 0.63 micron wavelength where the mirror 2 is in contact with the annular surface 4.

As shown in FIGS. 1 and 2, an engaging surface of the optical element 2 and the mounting surface 4 of the support member 3 are in contact with one another. The contacting surfaces form a vacuum seal between the optical element and the support member. No o-ring or other sealant is necessary between these surfaces to provide an adequate vacuum seal. The vacuum seal between the surfaces prevents ingress of the surrounding atmosphere, at least to a large and acceptable degree, into the low pressure laser discharge cavity during use of the laser in the earth's atmosphere. Egress of the laser gases, at least to a large and acceptable degree, to a surrounding lower pressure is also prevented to facilitate use of the laser in outer space.

Figure 7:
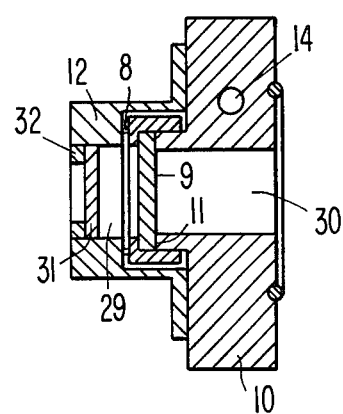
FIG. 7 is a cross-sectional view like that of FIG. 3 through the central optic axis of an optical element mounting arrangement suitable for outer space applications.

To facilitate the assembly of the optical element and the support member and also to protect the optical element when mounted on the laser and to aid in holding the optical element in position on the support member, an additional support member 5 is releasably connected to the mounting support member 3 by means of fasteners 6. The additional support member 5 has an opening or recess 7 within which the optical element is located before mounting it on the support member 3. A resilient member 8 in the form of a surgical tube, for example, extends about the periphery of the optical element between the additional support member 5 and the optical element on the side of the optical element opposite the surface thereof which is to be adhered to the mounting support member 3. The resilient member 8 aids in uniformly distributing the light contacting pressure used to urge the optical element 2 against the mounting surface 4 during assembly or mounting and helps to hold the element 2 in its sealing position against the member 3. The additional support member 5 can also be formed of an aluminum alloy such as 2024 or 6061. The differential pressure on the optical element caused by the presence of atmospheric pressure on the outer side of the optical element and the lower pressure within the laser cavity on the inside of optical element bias the optical element against the support member to maintain the vacuum seal. However, in outer space special provision must be made to maintain such a pressure differential. The embodiment of FIG. 7 shows an arrangement for this purpose as discussed below.

Figure 3:
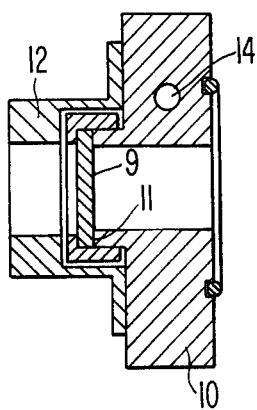
FIG. 3 is a cross-sectional view taken along the line III—III in FIG. 4 through the central optic axis of a transmitting mirror or output window mounting arrangement according to the invention.
Figure 4:
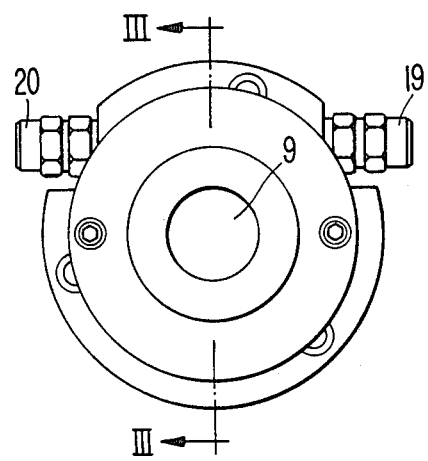
FIG. 4 is an in view of a laser beam transmitting mirror or output window mounting arrangement according to the second embodiment of the invention.

In the form of the invention illustrated in FIGS. 3 and 4, the optical element 9 is a transmitting mirror or output window. The element 9 is formed of zinc selenide which is coated with an anti-reflecting material on one side and a partially transmissive coating on the other. The output window has a surface figure or flatness indication of less than or equal to one fringe at 0.63 micron wavelength. The output window 9 is vacuum sealed to a laser mounting support member 10 in the manner described above with respect to the embodiment of FIGS. 1 and 2. More particularly, a mounting surface 11 of the support member 10 is lap polished to have a flat surface with a flatness of about four or fewer fringes at 0.63 micron wavelength. An engaging surface of an output window 9 is placed against the mounting surface 11 of the support member 10 to form a vacuum seal between the surfaces. Only light pressure contact between the surfaces is required to form the vacuum seal. The seal can be effected at ambient temperatures or even at the extreme temperatures of outer space.

The output window 9 is supported within an opening of an additional support member 12 in the manner described with respect to the embodiment in FIGS. 1 and 2 to aid in the assembly and maintenance of the mounting arrangement. The laser mounting support member 10 in FIGS. 3 and 4 and also the laser mounting support members 3 and 5 in FIGS. 1 and 2 are cooled or heated, if needed, as in outer space by conveying a fluid through respective passageways 13 and 14 provided therein. Appropriate fittings 15–20 are provided on the respective members for fluid inlets and outlets. The laser optical elements are in turn symmetrically cooled or heated by the uniform contact with the support members brought about by the invention. It is also possible to directly cool or heat a laser optical element such as a mirror, for example, by providing a suitable fitting thereon without departing from the scope invention.

Figure 5:
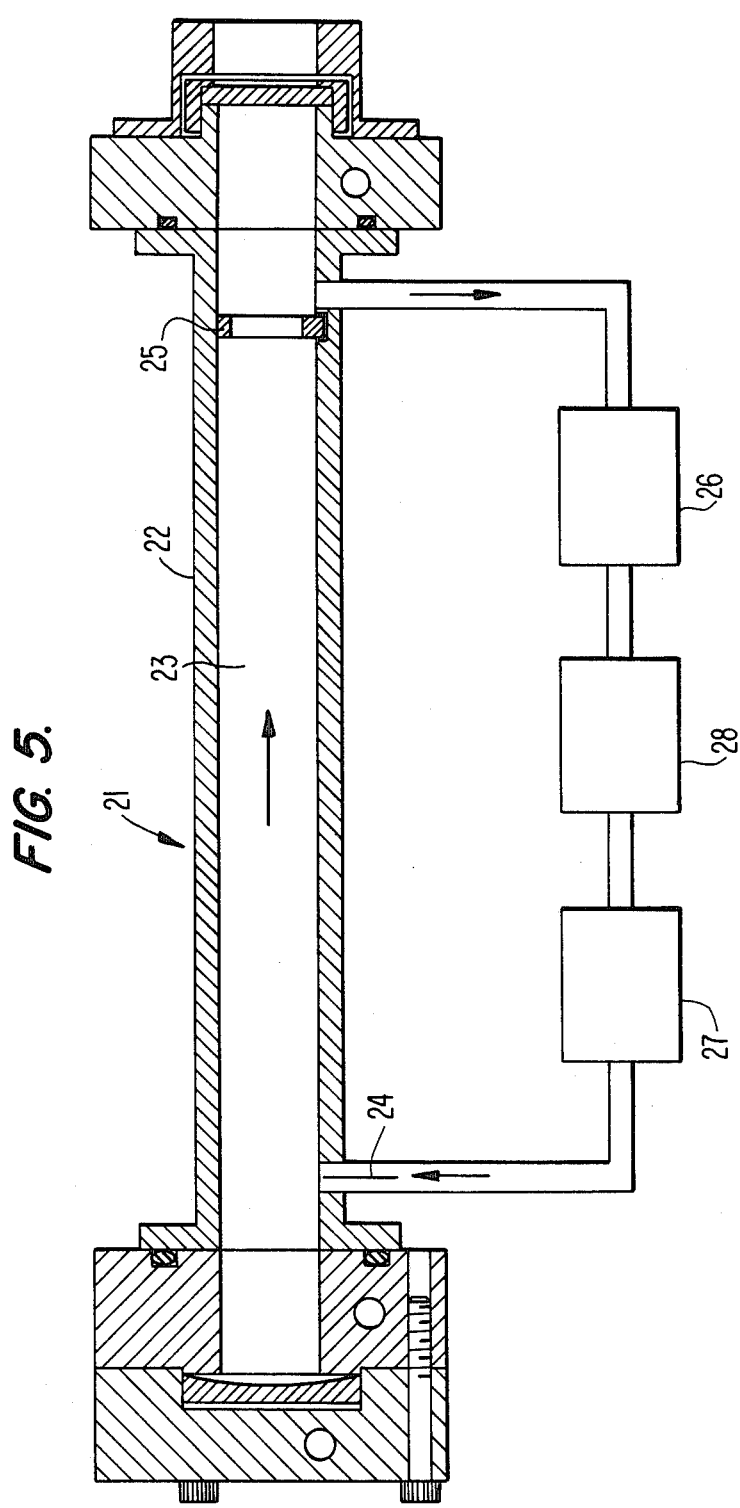
FIG. 5 is a side elevational view, partially in cross section of a gas laser with laser optical mounting arrangement according to the invention.

The method of mounting an optical element according to the invention can be used to mount a reflecting mirror, a transmitting mirror, or an output window on a flowing gas laser, for example. A flowing gas laser 21 according to the invention is shown in FIG. 5. The laser 21 comprises means 22 in the form of laser tube defining a discharge cavity 23 for lasing a flowing gas and respective electrodes 24 and 25 therein for electrically exciting the laser gas to cause it to lase. Gas is circulated in a closed loop through the laser tube 22 and heat exchangers 26 and 27 by means of a Roots blower 28 as shown in FIG. 5. The laser optical element mounting arrangement and method of the invention do not require the use of o-rings or other sealants in the vicinity of the optical elements thereby eliminating the possibility of causing particles of the sealant material to contaminate the optical element of the laser as a result of scattered radiation from the laser.

The vacuum seal formed is not dependent on temperature stability to maintain the seal. This readily allows any necessary heating or cooling for the optical element or other requirements for laser performance stability. The vacuum seal also improves the thermodynamics of the laser because of the good heat conductivity through the seal. Also, little or no mechanical loading on the optical elements is required in their assembled condition. All forces applied to the optical elements during assembly are uniformly distributed around the mounting surface, so that there is no distortion of the optical elements and hence, no distortion of the laser beam. Uniform, symmetrical cooling or heating of the optical elements occurs to prevent thermal distortion thereof. The optical elements can be placed in contact with only hand pressure. Removal for cleaning and replacement of the optical elements is possible with little or no retuning of the laser.

Figure 6:
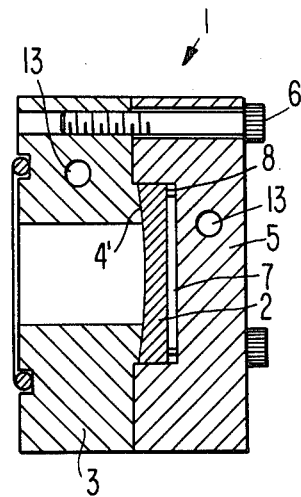
FIG. 6 is a cross-sectional view of a laser rear mirror mounting arrangement like that in FIG. 1 except that the mounting surface of the support member is curvilinear to mate with the curvilinear surface of the rear mirror.

The embodiment shown in FIG. 6 is similar to that of FIGS. 1 and 2 except the mounting surface 4' is curved in a manner similar to the surface of the optical element 2 for mating engagement therewith to form a vacuum seal. The engaged surfaces contact one another over a wider area than the essentially line contact achieved in the arrangement of FIGS. 1 and 2. If desired, this wider contact area could also be attained by lapping the edge of the curved element 2 in FIGS. 1 and 2 to form a flat surface on the element for cooperation with the flat mounting surface 4. The curved optical element can be either convex or concave.

FIG. 7 shows an arrangement similar to FIG. 3 except that a chamber 29 is defined on an outer side of the output window or mirror 9. A pressure is maintained in the chamber 29 which is at least slightly higher than the pressure within the resonator chamber 30 of the laser. The pressure within chamber 29 is sufficient to cause an adequate vacuum seal about the output window or mirror 9. The open end of the support member 12 in FIG. 3 is closed in FIG. 7 by an additional output window 31. The window 31 is held in position in member 12 and forms a vacuum seal in space with lip ring 32 in the opening of member 12.

While I have shown and described only three embodiments in accordance with the invention, it is understood that the same is not limited thereto, but is susceptible to numerous changes and modifications as known to those skilled in the art. For example, the invention is applicable for other than flowing gas lasers. Therefore, I do not wish to be limited to the details shown and described herein, but intend to cover all such changes and modifications as are encompassed by the scope of the appended claims.

I claim:

1. A method of mounting and sealing an optical element of a laser to a mounting support member of the laser comprising the steps of providing an optical element mounting surface of said support member with a smooth surface which is sufficiently smooth to form a vacuum seal with a surface of said optical element, said vacuum seal preventing at least to a large and acceptable degree, movement of gases through said seal between said optical element and said mounting support member as a result of a gas pressure differential across said seal during operation of said laser and contacting said surface of said optical element with said mounting surface of said support member, at ambient temperature to form said vacuum seal between said surfaces without the use of a sealant between said surfaces, and wherein said vacuum seal between said surfaces can be broken and remade without use of a sealant.

2. A method according to claim 1, wherein said optical element mounting surface of said support member is flat.

3. A method according to claim 2, wherein said flat optical element mounting surface of said support member has a flatness of about four of fewer fringes at 0.63 micron wavelength.

4. A method according to claim 2, wherein said surface of said optical element is flat.

5. A method according to claim 4, wherein said flat surface of said optical element has a flatness which is about four or fewer fringes at 0.63 micron wavelength.

6. A method according to claim 2, wherein said surface of said optical element is curvilinear.

7. A method according to claim 1, wherein said optical element mounting surface of said support member is a curved surface.

8. A method according to claim 7, wherein said surface of said optical element is curved in a similar manner to said curved surface of said support member for mating engagement therewith for effecting said vacuum seal.

9. A method according to claim 1, wherein said surfaces are contacted with one another under only light pressure contact and at ambient temperature to form said vacuum seal.

10. A method according to claim 1, wherein the step of providing the mounting surface of the support member includes lap polishing the surface so that it is sufficiently smooth to form said vacuum seal with said surface of the optical element.

11. A method according to claim 1, wherein said support member is formed of an aluminum alloy.

12. A method according to claim 1, wherein at least said surface of said optical element to be contacted with the mounting surface of said support member is coated with a layer of a material.

13. A method according to claim 12, wherein said layer of material is a metal.

14. A method according to claim 13, wherein said metal is selected from the group consisting of gold, a gold-silver alloy and silver.

15. A method according to claim 13, wherein said layer of metal is copper.

16. A method according to claim 12, wherein said layer of material is a non-metallic material.

17. A method according to claim 16, wherein said non-metallic material is a non-metallic dielectric layer.

18. A method according to claim 17, wherein said non-metallic dielectric material layer is formed over a coating of silver.

19. A method according to claim 12, wherein said coating is provided over a coating of nickel applied on at least said surface of said optical element support member.

20. A method according to claim 19, wherein the coated optical element is formed of copper.

21. A method according to claim 1, wherein the optical element is formed of zinc selenide.

22. A method according to claim 1, wherein said step of contacting includes first supporting said optical element within an opening of an additional support member and thereafter moving said additional support member and said optical element therein so as to engage said surface of said optical element with said mounting surface of said mounting support member to effect said vacuum seal.

23. A method according to claim 22, wherein a resilient member is positioned axially between said additional support member and said optical element therein on the side of said optical element opposite said surface to be contacted with said mounting support member for uniformly distributing the mounting pressures on said optical element.

24. A method according to claim 23, further comprising the step of maintaining pressure on said optical element to maintain said vacuum seal in the earth's atmosphere or in outer space.

25. A laser optical element mounting and sealing arrangement comprising a laser optical element and a laser mounting support member, said mounting support member having a smooth optical element mounting surface to which a surface of said optical element is contacted to form a vacuum seal without the use of a sealant between said surfaces, said vacuum seal preventing, at least to a large and acceptable degree, movement of gases through said seal between said optical element and said mounting support member as a result of a gas pressure differential across said seal during operation of an associated laser, and wherein said vacuum seal between said surfaces can be broken and remade without use of a sealant.

26. A laser optical element mounting and sealant arrangement according to claim 25, wherein said smooth optical element mounting surface is flat.

27. A laser optical element mounting and seal arrangement according to claim 26, wherein said flat optical element mounting surface has a flatness of about four or fewer fringes at 0.63 micron wavelength.

28. A laser optical element mounting and sealing arrangement according to claim 26, wherein said surface of said optical element is flat.

29. A laser optical element mounting and sealing arrangement according to claim 28, wherein said surface of said optical element has a flatness of about four or fewer fringes at 0.63 micron wavelength.

30. A laser optical element mounting and sealing arrangement according to claim 26, wherein said surface of said optical element is curvilinear so as to make essentially line contact with said flat surface for forming said vacuum seal.

31. A laser optical element mounting and sealing arrangement according to claim 25, wherein said optical element mounting surface is a curved surface.

32. A laser optical element mounting and sealing arrangement according to claim 31, wherein said surface of said optical element is curved in a similar manner to said curved optical element mounting surface, so that said surfaces are in mating engagement for effecting said vacuum seal.

33. A laser optical element mounting and sealing arrangement according to claim 25, wherein said optical element is located within an opening of an additional support member which is releasably connected to said mounting support member.

34. A laser optical element mounting and sealing arrangement according to claim 33, wherein a resilient member is mounted between said additional support member and said optical element on the side of said optical element opposite the surface of said optical element which is vacuum sealed to said mounting support member.

35. A laser optical element mounting and sealing arrangement according to claim 25, wherein said support member is formed of an aluminum alloy.

36. A laser optical element mounting and sealing arrangement according to claim 25, wherein at least said surface of the optical element in contact with said mounting support member is coated with a layer of a material.

37. A laser optical element mounting and sealing arrangement according to claim 36, wherein said layer of material is a metal.

38. A laser optical element mounting and sealing arrangement according to claim 37, wherein said metal is selected from the group consisting of gold, a gold-silver alloy and silver.

39. A laser optical element mounting and sealing arrangement according to claim 37, wherein said metal is copper.

40. A laser optical element mounting and sealing arrangement according to claim 36, wherein said layer of material is a non-metallic material.

41. A laser optical element mounting and sealing arrangement according to claim 40, wherein said non-metallic material is a non-metallic dielectric layer.

42. A laser optical element mounting and sealing arrangement according to claim 41, wherein said non-metallic dielectric material layer is formed over a coating of silver.

43. A laser optical element mounting and sealing arrangement according to claim 36, wherein said coating is provided over a coating of nickel on at least said surface of said optical element which contacts said mounting support member.

44. A laser optical element mounting and sealing arrangement according to claim 36, wherein said coated optical element is formed of copper.

45. A laser optical element mounting and sealing arrangement according to claim 25, wherein said optical element is formed of zinc selenide.

46. A laser optical element mounting and sealing arrangement according to claim 25, wherein said optical element is a reflecting mirror.

47. A laser optical element mounting and sealing arrangement according to claim 25, wherein said optical element is an output window.

48. A laser optical element mounting and sealing arrangement according to claim 25, wherein chamber means are provided about an outer side of said optical element for maintaining a fluid pressure on the outer side of said optical element to maintain said vacuum seal in outer space or other vacuum conditions.

49. In a gas laser comprising means defining a lasing cavity for a gas of the laser, means for exciting the gas in said cavity, and at least one optical element for interacting with the light emitted by the lasing gas in said laser, the improvement comprising said laser optical element being mounted and sealed to said gas laser at a laser mounting support member, said mounting support member having a smooth surface forming a vacuum seal with a surface of said optical element in contact therewith without the use of a sealant between said contacting surfaces, said vacuum seal preventing, at least to a large and acceptable degree, movement of gases through said seal between said optical element and said mounting support member as a result of a gas pressure differential across said seal during operation of said laser, and wherein said vacuum seal between said surfaces can be broken and remade without use of a sealant.

50. A laser optical element mounting and sealing arrangement according to claim 25, wherein said optical element is selected from the group consisting of a reflecting mirror, a transmitting mirror and an output window.

51. The gas laser according to claim 49, wherein said at least one optical element is selected from the group consisting of a reflecting mirror, a transmitting mirror and an output window.

* * * * *